United States Patent
Sato

(10) Patent No.: US 6,314,206 B1
(45) Date of Patent: *Nov. 6, 2001

(54) COMPRESSION RATIO SETTING DEVICE

(75) Inventor: Koichi Sato, Saitama (JP)

(73) Assignee: Asahi Kogaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,643

(22) Filed: Apr. 2, 1998

(30) Foreign Application Priority Data

Apr. 7, 1997 (JP) .................................................. 9-103873

(51) Int. Cl.[7] ...................................................... G06K 9/36
(52) U.S. Cl. ........................................... 382/235; 382/239
(58) Field of Search ..................................... 348/231, 362, 348/232, 233, 240, 384, 201, 220, 399.1; 358/342; 382/232, 235, 239, 282, 298, 299

(56) References Cited

U.S. PATENT DOCUMENTS

| | | | |
|---|---|---|---|
| 5,016,107 | * 5/1991 | Sasson et al. | 348/231 |
| 5,294,990 | 3/1994 | Aoki . | |
| 5,444,483 | * 8/1995 | Maeda | 348/231 |
| 5,467,129 | * 11/1995 | Suzuki | 348/231 |
| 5,526,138 | * 6/1996 | Sato | 358/342 |
| 5,606,427 | * 2/1997 | Sato | 358/342 |
| 5,619,265 | * 4/1997 | Suzuki et al. | 348/362 |
| 5,633,976 | * 5/1997 | Ogino | 348/231 |
| 5,734,425 | * 3/1998 | Takizawa et al. | 348/231 |
| 5,748,233 | * 5/1998 | Kitajima | 348/231 |
| 5,821,997 | * 10/1998 | Kawamura et al. | 348/231 |
| 5,845,011 | * 12/1998 | Miyamoto et al. | 382/232 |
| 5,859,666 | * 1/1999 | Manabe | 348/231 |

* cited by examiner

*Primary Examiner*—Phuoc Tran
*Assistant Examiner*—Amir Alavi
(74) *Attorney, Agent, or Firm*—Greenblum & Bernstein, P.L.C.

(57) ABSTRACT

A compression ratio setting device comprises a digital signal processing circuit, in which a digital image signal is compressed, according to the JPEG algorithm, for example, with a compression ratio. The compressed image signal is recorded in a memory card in a quality priority mode, in which a quality of an image, which is reproduced from the compressed image signal, has priority over a number of images which can be recorded in the memory card, or a number priority mode, in which the number of images has priority over the quality. When the quality priority mode is selected, the compression ratio decreases as the number of pixel signals of the compressed image signal increases. When the number priority mode is selected, the compression ratio increases as the number of pixel signals of the compressed image signal increases.

21 Claims, 7 Drawing Sheets

FIG. 2
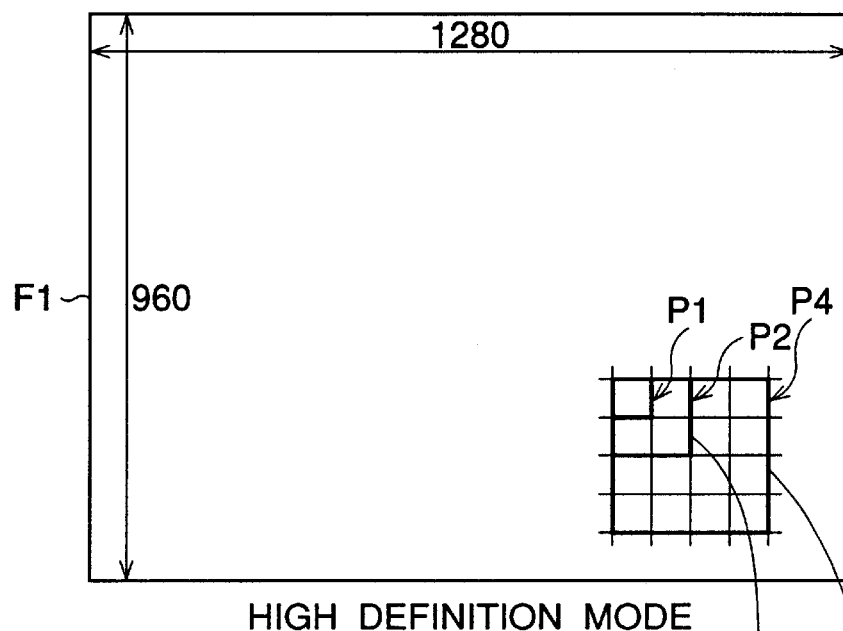
HIGH DEFINITION MODE
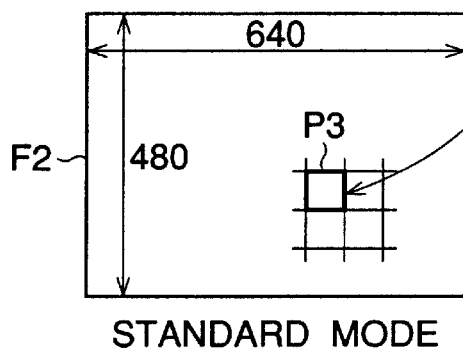
STANDARD MODE
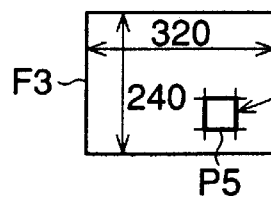
ECONOMY MODE

COMPRESSION RATIO SETTING DEVICE

BACKGROUND OF THE INVENTION

1. Field of the Invention

The present invention relates to an electronic still camera by which an image signal, obtained through an imaging device, can be compressed and recorded in a recording medium.

2. Description of the Related Art

In a conventional electronic still camera, an image signal obtained by an imaging device is processed to combine pixel values of selected adjacent pixel signals, or to pick up a part of the image signal, so that an image having pixels, the number of which is less than that of the imaging device, is generated. Further, there is known a conventional electronic still camera, in which an image obtained by the combining process or the picking-up process is recorded in a recording medium.

In a recording operation, using the above described electronic still camera, when a high definition mode, in which a high quality image can be recorded, is set, a substantial portion of the information contained in the high quality image would be lost if a compression ratio, with which the image is recorded in the recording medium, is set to a high value. Accordingly, in this case, even if the image is reproduced from the recording medium in a high definition mode, an image having a high quality cannot be obtained. On the other hand, when a predetermined number of images are to be recorded in the recording medium, if the compression ratio is set to a low value, thus selecting a high definition mode, the desired number of images cannot be recorded since the number of pixels of one image is too great.

SUMMARY OF THE INVENTION

Therefore, an object of the invention is to provide a compression ratio setting device by which an image having a desired quality can be definitely obtained, and a desired number of images can be definitely recorded in a recording medium.

According to the present invention, there is provided a compression ratio setting device provided in an electronic still video camera, the device comprising an imaging device, an image signal generator, a compression ratio setting processor, and an image compression processor.

A first image signal having pixel signals is obtained by the imaging device. The image signal generator generates a second image signal having pixel signals, a number of which is less than or equal to a number of pixel signals of the first image signal. The compression ratio setting processor sets a compression ratio in accordance with the number of pixel signals of the second image signal. The image compression processor compresses the second image signal with the compression ratio to obtain a compressed image signal.

Further, according to the present invention, there is provided a compression ratio setting device provided in an electronic still video camera, the device comprising an imaging device, an image signal generator, a compression ratio setting processor, and an image signal compression processor.

A first image signal having pixel signals is obtained by the imaging device. The image signal generator enlarges a part of the first image signal with a zoom magnification ratio to generate a second image signal having pixel signals, a number of which is equal to a number of pixel signals of the first image signal. The compression ratio setting processor sets a compression ratio in accordance with the zoom magnification ratio. The image signal compression processor compresses the second image signal with the compression ratio.

BRIEF DESCRIPTION OF THE DRAWINGS

The present invention will be better understood from the description of the preferred embodiments of the invention set forth below, together with the accompanying drawings, in which:

FIG. 2 is a view showing a number of pixels contained in an image in each of the quality modes;

DESCRIPTION OF THE PREFERRED EMBODIMENTS

Figure 1:
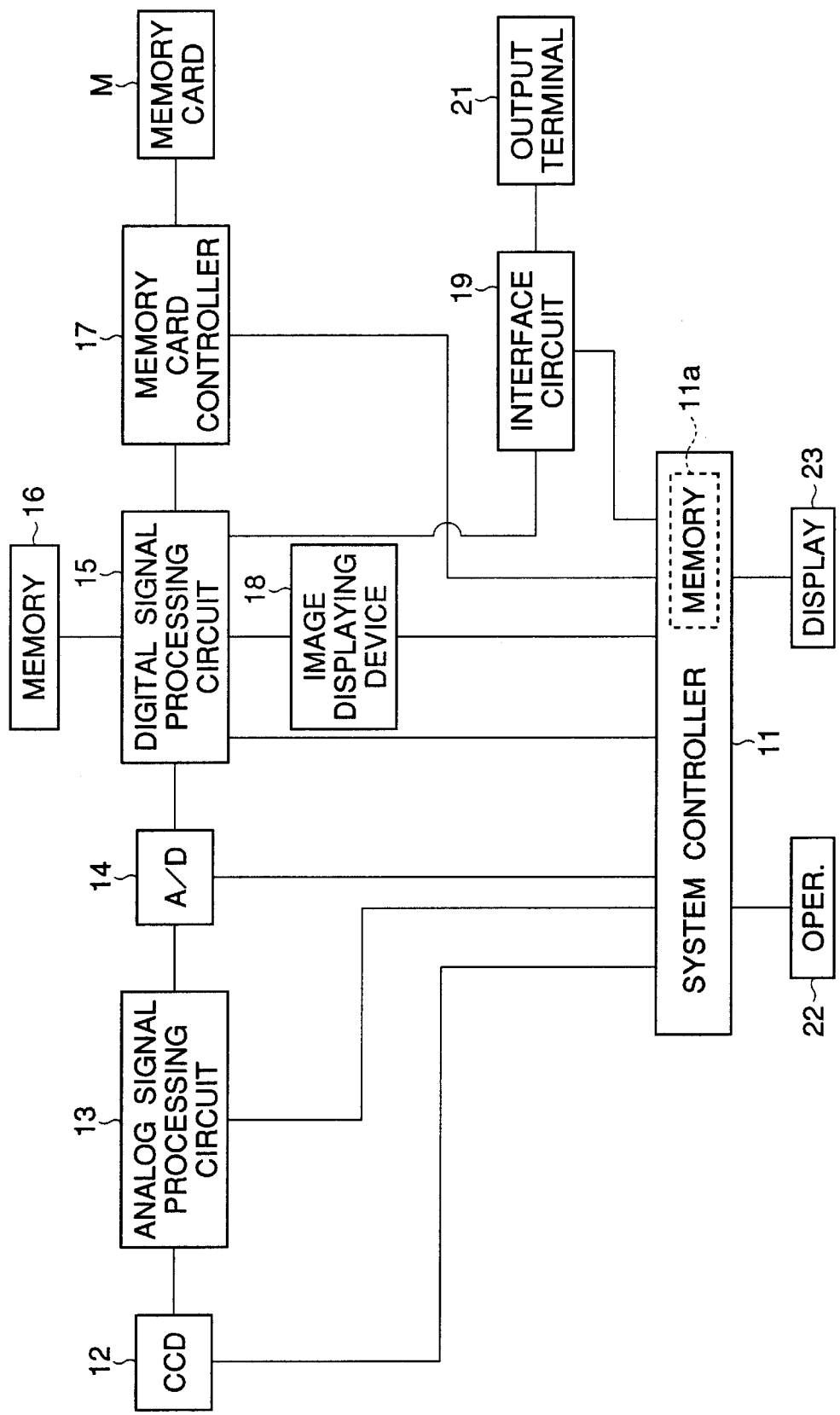
FIG. 1 is a block diagram of a compression ratio setting device of an embodiment of the present invention.

The present invention will be described below with reference to embodiments shown in the drawings.

FIG. 1 shows a block diagram of an electric circuit of a compression ratio setting device of an embodiment of the present invention.

A system controller 11 is a microcomputer, by which the compression ratio setting device is controlled as a whole, and in which a memory 11a is mounted. An imaging device (charge coupled device (CCD)) 12 is disposed on an optical axis (not shown), so that an image is formed on a light receiving surface of the CCD 12, and thus analog pixel signals, forming a first image signal, are outputted from the CCD 12. Then, the pixel signals are subjected to a predetermined process, such as correlated double sampling, in an analog signal processing circuit 13, and are converted into digital signals by an A/D converter 14.

The digital pixel signals are temporarily stored in a buffer memory 16, through a digital signal processing circuit 15, before being read from the buffer memory 16, and inputted into the digital signal processing circuit 15. The first image signal, converted to a digital signal, is transformed into a second image signal having pixel signals, the number of which, while being determinable according to necessity, is less than or equal to a number of the pixel signals of the first image signal. The second image signal is then subjected to an image compression process, according to the JPEG, for example, so that a compressed second image signal is generated. The format of the compressed second image signal outputted from the digital signal processing circuit 15 is converted to a predetermined format in a memory card controller 17, so that the compressed image signal is recorded in a memory card M.

In addition, the pixel signals of the first image signal, read from the buffer memory 16, are converted by the digital signal processing circuit 15 to image data, according to a predetermined format, corresponding to the pixel signals of the first image signal. The image data are transmitted to an image displaying device 18, having a liquid crystal display, for example, under control of the system controller 11, so that an image is indicated on a surface of the image displaying device 18. Further, the image data, outputted from the digital signal processing circuit 15, can be outputted to an interface circuit 19 under control of the system controller 11. Namely, the image data are converted to a signal, which conforms to a standard or a regulation of an external device connected to an output terminal 21, and are transmitted to the external device through the output terminal 21.

An operation unit 22 and a display 23 are connected to the system controller 11. The operation unit 22 is provided with a switch for selecting a compression ratio and a quality mode by which an image is to be recorded in the memory card M. The display 23 is provided with a liquid crystal display for indicating an operation mode of the electronic still camera, in which this compression ratio setting device is mounted.

FIG. 2 shows a number of pixels contained in an image of each of the quality modes, including a high definition mode, a standard mode and an economy mode. Reference F1 indicates a number of pixels of a single image in the high definition mode, in which the number of pixels in a lateral direction is 1280 and the number of pixels in a vertical direction is 960. Reference F2 indicates a number of pixels of a single image in the standard mode, in which the number of pixels in a lateral direction is 640 and the number of pixels in a vertical direction is 480. Reference F3 indicates a number of pixels of a single image in the economy mode, in which the number of pixels in a lateral direction is 320 and the number of pixels in a vertical direction is 240.

In the high definition mode, a pixel signal P1, of the first image signal obtained by the CCD 12, having been subjected to no further processing, is outputted from the digital signal processing circuit 15. In the standard mode, a pixel signal P3 is generated by averaging four adjacent pixel signals of the first image signal, i.e. a 2×2 matrix of pixel signals P2. Note that, alternatively, a single pixel signal, included in the 2×2 matrix of pixel signals P2, may be adopted as representing the mean value of the pixel block. In the economy mode, a pixel signal P5 is generated by averaging a 4×4 matrix of pixel signals P4 from the first image signal. Note that, alternatively, a single pixel signal, included in the 4×4 matrix of pixel signals P4, may be adopted as representing the mean value of the pixel block.

Thus, a single pixel signal P1, P3 or P5 of the second image signal is derived from a predetermined number of pixel signals which are adjacent to each other in the first image signal, so that the second image signal is generated. Alternatively, a part of the first image signal is extracted, corresponding to one pixel signal, which may be an upper-left pixel signal, from the predetermined pixel block, so that the second image signal is thereby generated.

Figure 3:
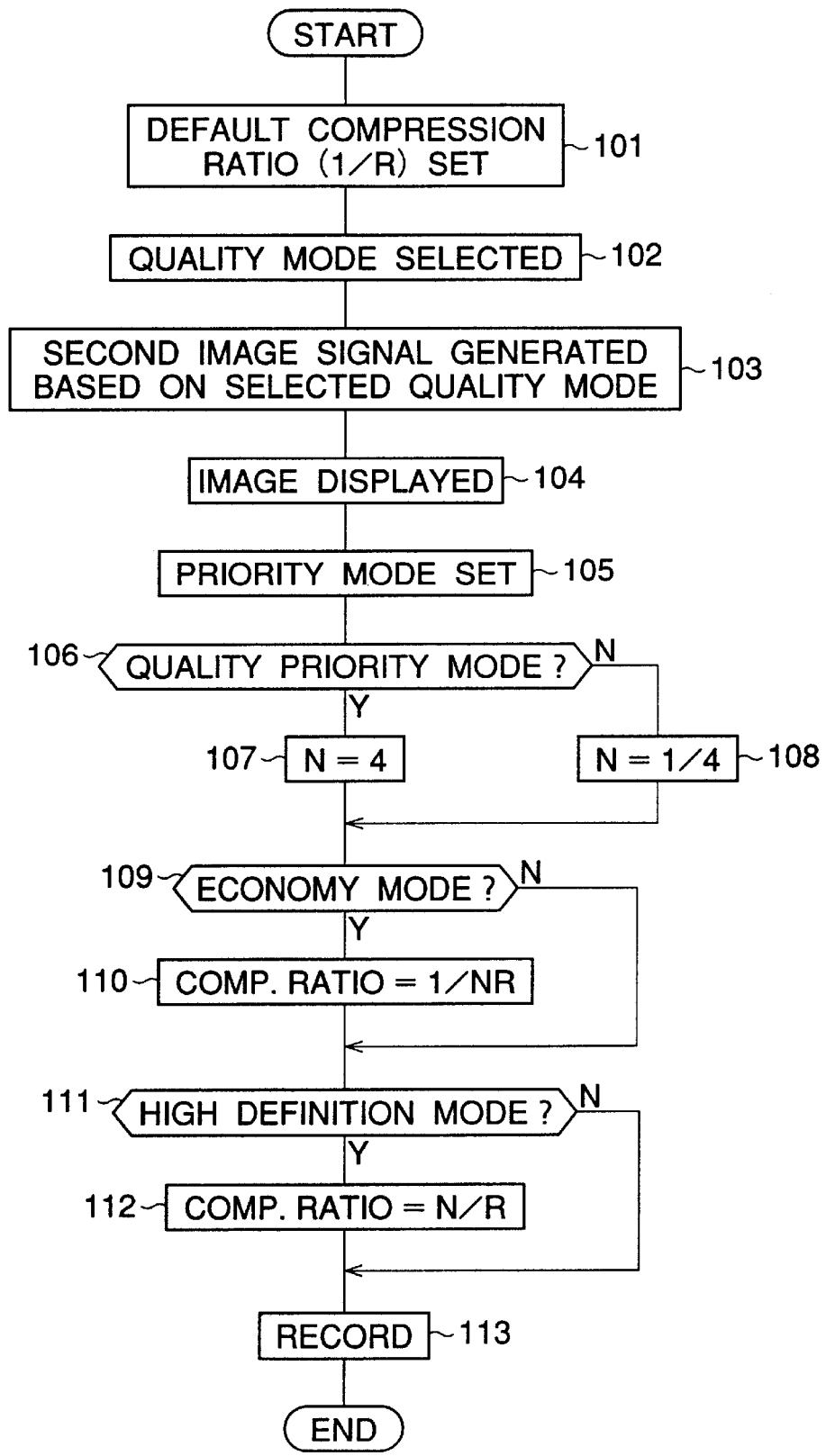
FIG. 3 is a flow chart of a program in which an appropriate compression ratio is set for each of the quality modes and an image is recorded in a recording medium.

FIG. 3 is a flow chart of a program in which an appropriate compression ratio is set for each of the quality modes and an image is recorded in the memory card M.

In Step 101, two values of a default compression ratio 1/R are set in accordance with the available priority modes. The values of the default compression ratio are prestored in the memory 11a of the system controller 11. Note that, in this specification, a large compression ratio corresponds directly to a large value of "R", and a small compression ratio corresponds directly to a small value of "R", where "R" is a default compression value.

In Step 102, one of the quality modes is selected via the operation unit 22. The quality modes include the high definition mode, the standard mode and the economy mode. In Step 103, a process, by which the second image signal is generated based on the selected quality mode, as described above with reference to FIG. 2, is performed in the digital signal processing circuit 15. The image corresponding to the second image signal is displayed on the surface of the image displaying device 18 in Step 104.

Then, in Step 105, one of the priority modes, along with the respective default compression ratio, is selected through the operation unit 22. The priority modes, in relation to a manner in which a compressed image signal is recorded in the memory card M, correspond to a quality and an amount of storage area utilized. The priority modes include a quality priority mode, in which a quality of an image, which is reproduced from the compressed image signal, has priority over a number of images which can be recorded in the memory card M, and a number priority mode, in which the number of images has priority over the quality of an image.

It is determined in Step 106 whether the quality priority mode has been set. When the quality priority mode has been set, Step 107 is executed, in which a compression ratio correction coefficient N is set to 4. Conversely, when the quality priority mode has not been set, i.e. when the number priority mode has been set, Step 108 is executed, in which the compression ratio correction coefficient N is set to 1/4.

In Step 109, it is determined whether the economy mode has been set. When the economy mode has been set, Step 110 is executed, in which the compression ratio is set to 1/[NR]. Conversely, when the economy mode has not been set, Step 110 is skipped, so that Step 111 is executed. In Step 111, it is determined whether the high definition mode has been set. When the high definition mode has been set, Step 112 is executed, in which the compression ratio is set to N/R. Conversely, when the high definition mode has not been set, Step 112 is skipped, so that Step 113 is executed.

Thus, due to Steps 104 through 112, the compression ratio in each of the quality modes is set as indicated below.

|  | QUALITY PRIORITY MODE | NUMBER PRIORITY MODE |
| --- | --- | --- |
| ECONOMY MODE | 1/[4R] | 4/R |
| STANDARD MODE | 1/R | 1/R |
| HIGH DEF. MODE | 4/R | 1/[4R] |

Note that the default compression ratio, corresponding to the default compression value R, of the quality priority mode has a different value from that of the number priority mode. For example, the default compression ratio is 1/8 in the quality priority mode, and is 1/64 in the number priority mode. Therefore, in this example, when the quality priority mode is selected, the compression ratio is 1/32 in the economy mode, and is 1/2 in the high definition mode. Namely, the compression ratio decreases as the number of pixel signals in the second image signal increases. On the other hand, when the number priority mode is selected, the compression ratio is 1/16 in the economy mode, and is 1/256 in the high definition mode. Namely, the compression ratio increases as the number of pixel signals in the second image signal increases.

In Step 113, the image signal is compressed, according to the JPEG algorithm, for example, using the compression ratio set in Steps 106 through 112, and the compressed image signal is recorded in the memory card M.

The compression process of the JPEG algorithm is performed as follows. First, pixel signals forming one frame image are divided into a plurality of blocks, each of which is comprised of an 8×8 pixel data matrix. The 8×8 pixel data matrix is subjected to a discrete cosine transformation (i.e. DCT) and converted to 64 DCT coefficients, each of which corresponds to a spatial frequency. The DCT coefficients are divided by a quantization table which is composed of 64 quantization coefficients, so that quantized DCT coefficients are obtained. The quantized DCT coefficients are encoded using Huffman encoding, and thus a compressed image signal is obtained. The compression ratios correspond to quantization tables, which are stored in the digital signal processing circuit 15 (FIG. 1). Thus, the compression process is carried out using a quantization table with values corresponding to the compression ratio which was set by Step 101, 110 or 112.

As described above, according to the recording operation shown in FIG. 3, when the quality priority mode is selected, a relatively low compression ratio is set in the high definition mode, and a relatively high compression ratio is set in the economy mode. Accordingly, the amount of information lost from the recorded image data becomes less in the high definition mode in comparison with the other modes, so that a high quality image can be obtained when the image is reproduced from the memory card M.

On the other hand, when the number priority mode is selected, a relatively high compression ratio is set in the high definition mode, and a relatively low compression ratio is set in the economy mode. Namely, the image signal is greatly compressed in the high definition mode, in comparison with the other modes, so that the number of images, which can be recorded in the memory card M, can be ensured.

Figure 4:
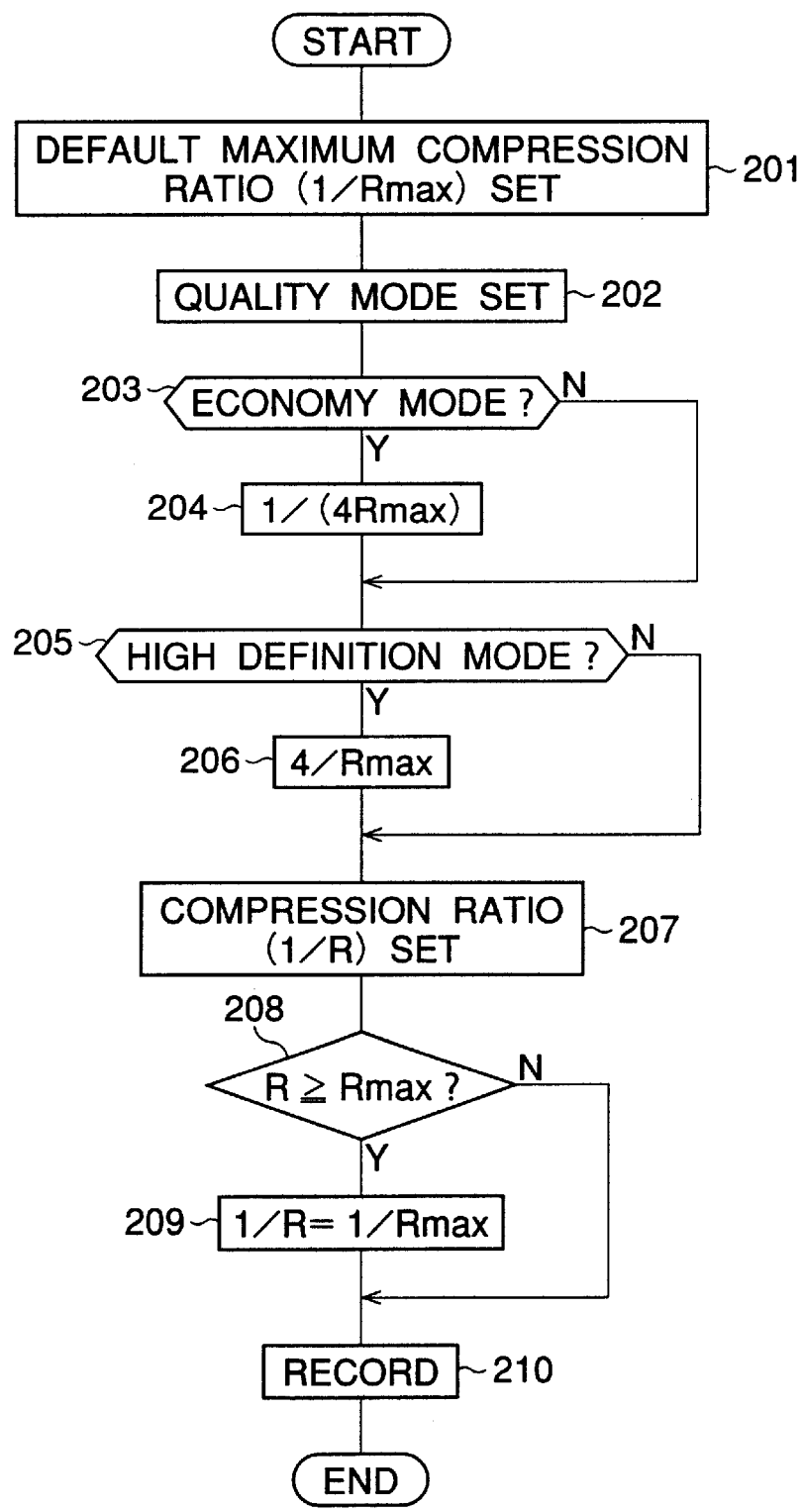
FIG. 4 is a flow chart of a program in which, in a quality priority mode, an image is recorded in a recording medium, while controlling a maximum compression ratio, the program corresponding to the program shown in FIG. 3.

FIG. 4 is a flow chart of a program in which, in the quality priority mode, an image is recorded in the memory card M, while controlling a maximum compression ratio, to ensure a level of image quality is maintained.

In Step 201, a maximum default compression ratio 1/Rmax, corresponding to a maximum default compression value Rmax, is set. The default maximum compression ratio is 1/16, for example, and is prestored in the memory 11$a$ of the system controller 11.

In Step 202, the quality mode is selected by utilizing the operation unit 22. The quality modes include the high definition mode, the standard mode and the economy mode, as described previously. Then, the second image signal is generated based on the selected quality mode, and the image corresponding to the second image signal is displayed on the surface of the image displaying device 18. In Step 203, it is determined whether the economy mode has been set. When the economy mode has been set, the maximum compression ratio is set to 1/[4Rmax], in Step 204, and when the economy mode has not been set, Step 204 is skipped. Then, in Step 205, it is determined whether the high definition mode has been set. When the high definition mode has been set, the compression ratio is set to 4/Rmax, in Step 206, and when the high definition mode has not been set, Step 206 is skipped.

Thus, from Steps 203 through 206, the maximum compression ratio in each of the quality modes is set. The maximum compression ratio is 1/64 in the economy mode, and is 1/4 in the high definition mode, for example. Namely, the maximum compression ratio decreases as the number of pixel signals in the second image signal increases.

In Step 207, the compression ratio 1/R is set via the operation unit 22. In Step 208, it is determined whether the compression value or denominator R of the compression ratio is greater than or equal to the maximum default compression value or denominator Rmax of the maximum compression ratio. When R is greater than or equal to Rmax, Step 209 is executed in which 1/Rmax is set to the actual compression ratio 1/R. Conversely, when R is smaller than Rmax, Step 209 is skipped.

In Step 210, the image signal is compressed, according to the JPEG algorithm, for example, using the compression ratio set by Steps 203 through 209, and the compressed image signal is recorded in the memory card M.

As described above, according to the recording operation shown in FIG. 4, the compression ratio, which is manually selected, is restricted by the maximum compression ratio. The maximum compression ratio decreases as the number of pixel signals of the second image signal increases, and is the smallest in the high definition mode. Therefore, when a high quality image is to be recorded using the high definition mode in the quality priority mode, even if a relatively high compression ratio is selected via the operation unit 22, the maximum compression ratio is limited, so that the image signal is not excessively compressed. Accordingly, a high quality image can be definitely reproduced.

Figure 5:
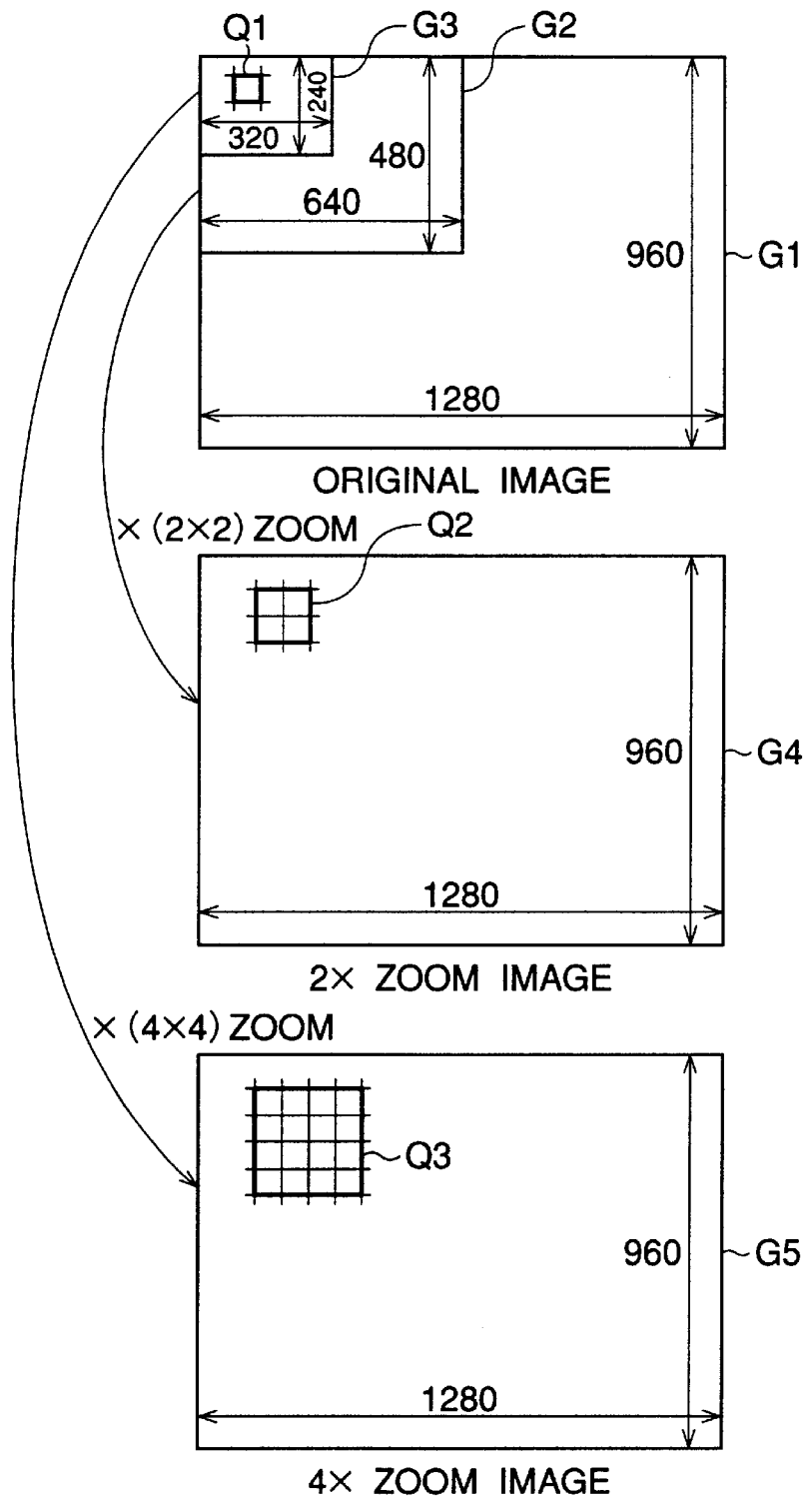
FIG. 5 is a view showing a number of pixels contained in an image obtained using a zoom magnification in an original image mode, a 2×zoom mode and a 4×zoom mode.

FIG. 5 shows a number of pixels contained in an image obtained using a zoom magnification in an original image mode, a two-times zoom mode (2×zoom mode) and a four-times zoom mode (4×zoom mode). Reference G1 indicates a number of pixels of an original image, in which the number of pixels in a lateral direction is 1280 and the number of pixels in a vertical direction is 960. Namely, the number of pixels of the original image mode is 1280×960. Reference G2 indicates a number of pixels of the original image selected in the 2×zoom mode, the number of pixels in a lateral direction being 640 and the number of pixels in a vertical direction being 480. In the 2×zoom mode, the image is enlarged in such a manner that 640×480 selected pixels are expanded to 1280×960 pixels, as shown by reference G4. Reference G3 indicates a number of pixels of the original image selected in the 4×zoom mode, the number of pixels in a lateral direction being 320 and the number of pixels in a vertical direction being 240. In the 4×zoom mode, the image is enlarged in such a manner that 320×240 selected pixels are expanded to 1280×960 pixels, as shown by reference G5.

In the original image mode, a pixel signal Q1, of the first image signal obtained from the CCD 12, having been subjected to no further processing, is outputted from the digital signal processing circuit 15. In the 2×zoom mode, a pixel signal Q1 of the first image signal is enlarged to a 2×2 matrix of pixel signals Q2. In the 4×zoom mode, a pixel signal Q1 is enlarged to a 4×4 matrix of pixel signals Q3. In the enlarging process, a pixel signal, which is included in the enlarged matrix of pixel signals and is not the original pixel signal Q1, is generated by interpolating adjacent pixel signals included in the first image signal.

Figure 6:
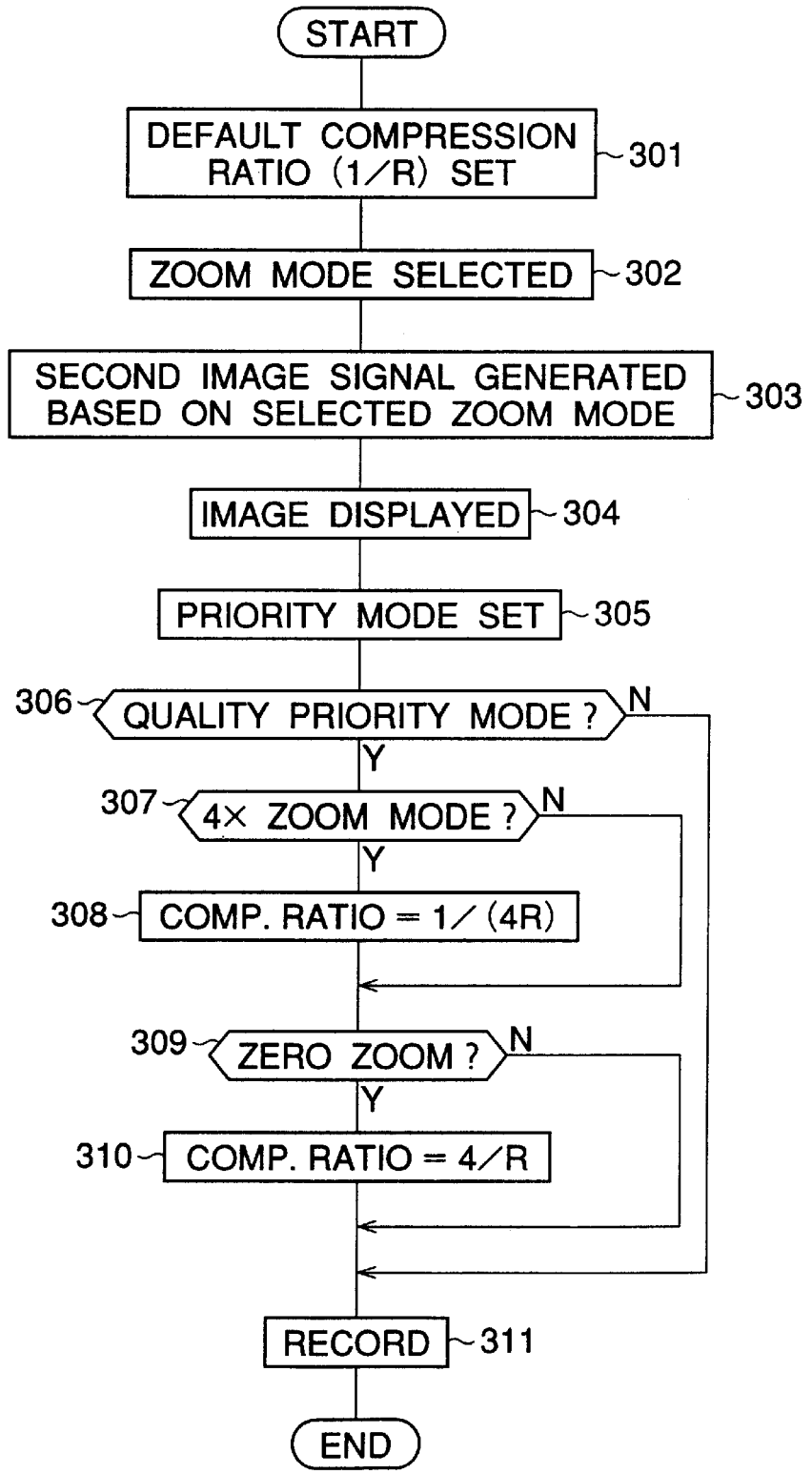
FIG. 6 is a flow chart of a program in which a compression ratio is set for each of the zoom modes and an image is recorded in a recording medium.

FIG. 6 is a flow chart of a program in which a compression ratio is set for each of the zoom modes and an image is recorded in the memory card M.

In Step 301, a value of a default compression ratio 1/R is set in accordance with the available priority modes. The default compression ratio is 1/8, for example, and is prestored in the memory 11$a$ of the system controller 11.

In Step 302, one of the zoom modes is selected via the operation unit 22. The zoom modes include the zero zoom mode (original zoom mode), the 2×zoom mode and the 4×zoom mode. In Step 303, a process, by which the second image signal is generated based on the selected zoom mode as described above with reference to FIG. 5, is performed in the digital signal processing circuit 15. The image corresponding to the second image signal is displayed on the surface of the image displaying device 18 in Step 304.

In Step 305, one of the priority modes, along with the respective default compression ratio, is selected through the operation unit 22. The priority modes, relating to a manner in which a zoom image signal is recorded in the memory card M, correspond to a quality and an amount of storage area utilized. The priority modes include a quality priority mode, in which a quality of an image, which is reproduced from the compressed image signal, has priority over a number of images which can be recorded in the memory card M, and a number priority mode, in which the number of images has priority over the quality of an image.

It is determined in Step 306 whether the quality priority mode has been set. When the quality priority mode has not been set, the process goes to Step 311. Conversely, when the quality priority mode has been set, it is determined in Step 307 whether the 4×zoom mode has been set. When the 4×zoom mode has been set, Step 308 is executed in which the compression ratio is set to 1/[4R]. Conversely, when the 4×zoom mode has not been set, Step 308 is skipped, so that Step 309 is executed. In Step 309, it is determined whether the zero zoom mode has been set. When the zero zoom mode has been set, Step 310 is executed in which the compression ratio is set to 4/R. Conversely, when the zero zoom mode has not been set, Step 310 is skipped, so that Step 311 is executed.

Thus, due to Steps 306 through 310, the compression ratio in each of the zoom modes is set as indicated below.

|  | QUALITY PRIORITY MODE | NUMBER PRIORITY MODE |
| --- | --- | --- |
| 4x ZOOM | 1/[4R] | 1/R |
| 2x ZOOM | 1/R | 1/R |
| ZERO ZOOM | 4/R | 1/R |

When the quality priority mode is selected, the compression ratio is the largest (e.g. 1/32) in the 4×zoom mode, and is the smallest (e.g. 1/2) in the zero zoom mode. In other words, the compression ratio increases as the zoom magnification increases. On the other hand, when the number priority mode is selected, the compression ratio is constant regardless of the zoom mode.

In Step 311, the image signal is compressed, according to the JPEG algorithm, for example, using the compression ratio set in Steps 306 through 310, and the compressed image signal is recorded in the memory card M.

As described above, according to the recording operation shown in FIG. 6, when the quality priority mode is selected, a relatively low compression ratio is set in the zero zoom mode, and a relatively high compression ratio is set in the 4×zoom mode. Namely, the compression ratio is proportionally set in relation to the zoom magnification, so that a predetermined quality image can be maintained when the image is reproduced from the memory card M.

Figure 7:
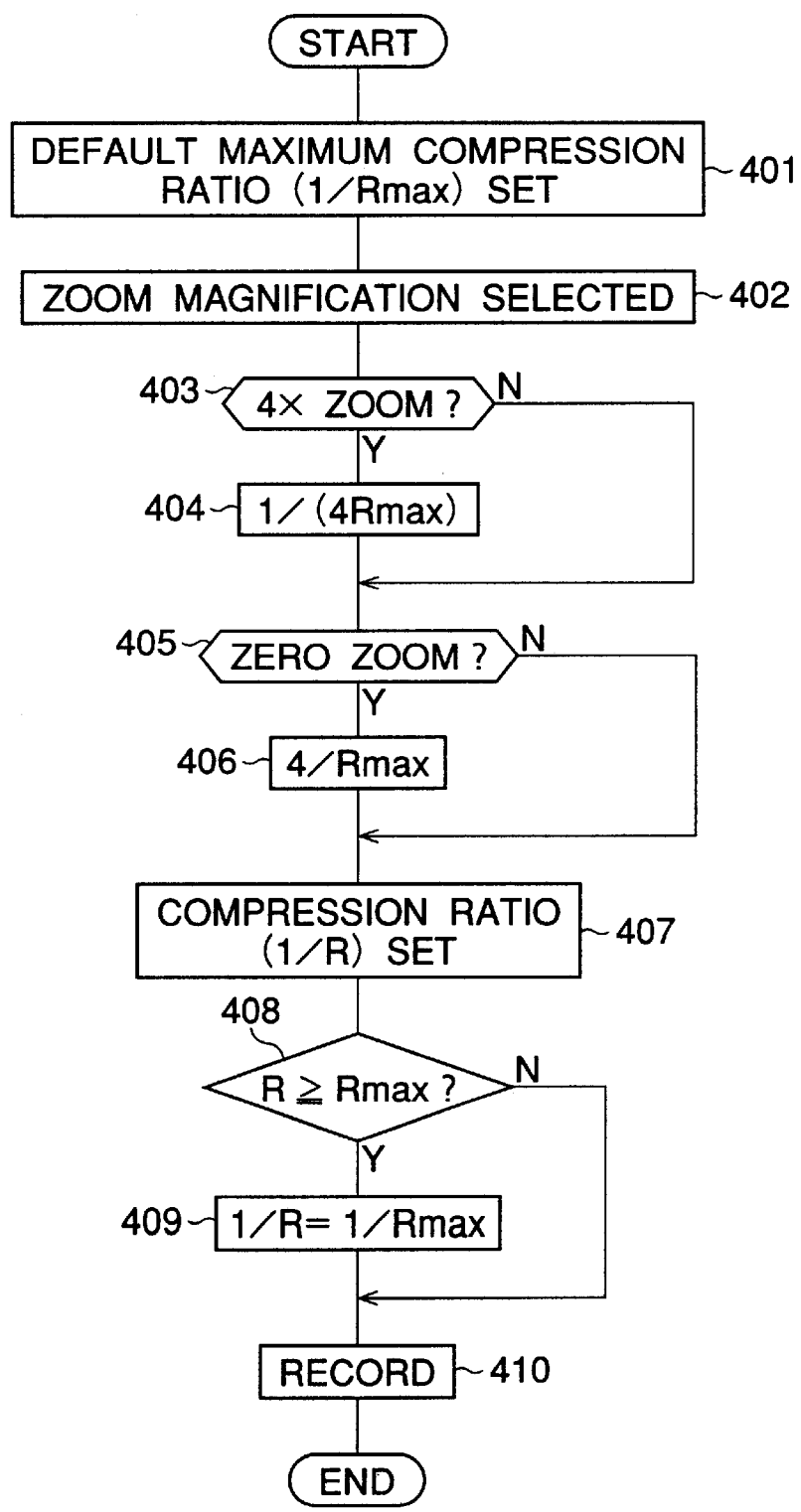
FIG. 7 is a flow chart of a program in which, in a quality priority mode, an image is recorded in a recording medium, while controlling a maximum compression ratio, the program corresponding to the program shown in FIG. 6.

FIG. 7 is a flow chart of a program in which, in the quality priority mode, an image is recorded in the memory card M, while controlling a maximum compression ratio, to ensure a level of image quality is maintained.

In Step 401, a default maximum compression ratio 1/Rmax is set. The default maximum compression ratio is 1/16, for example, and is prestored in the memory 11a of the system controller 11.

In Step 402, the zoom magnification is selected via the operation unit 22. Then, the second image signal is generated based on the selected zoom magnification, and the image corresponding to the second image signal is displayed on the surface of the image displaying device 18. In Step 403, it is determined whether the 4×zoom mode has been set. When the 4×zoom mode has been set, the maximum compression ratio is set to 1/[4Rmax] in Step 404, and when the 4×zoom mode has not been set, Step 404 is skipped. Then, in Step 405, it is determined whether the zero zoom mode has been set. When the zero zoom mode has been set, the compression ratio is set to 4/Rmax in Step 406, and when the zero zoom mode has not been set, Step 406 is skipped.

Thus, in Steps 403 through 406, the maximum compression ratio in each of the zoom modes is set. The maximum compression ratio is 1/64 in the 4×zoom mode, and is 1/4 in the zero zoom mode, for example. Namely, the maximum compression ratio increases as the zoom magnification increases.

In Step 407, the compression ratio 1/R is set through the operation unit 22. In Step 408, it is determined whether the compression value or denominator R of the compression ratio is greater than or equal to the maximum compression value or denominator Rmax of the maximum compression ratio. When R is greater than or equal to Rmax, Step 409 is executed in which 1/Rmax is set to the actual compression ratio 1/R. Conversely, when R is smaller than Rmax, Step 409 is skipped.

In Step 410, the image signal is compressed, according to the JPEG algorithm, for example, using the compression ratio set by Steps 403 through 409, and the compressed image signal is recorded in the memory card M.

As described above, according to the recording operation shown in FIG. 7, the compression ratio, which can be manually selected, is restricted by the maximum compression ratio. The maximum compression ratio increases as the zoom magnification increases. Therefore, when the zero zoom mode is selected, even if a relatively high compression ratio is selected via the operation unit 22, the maximum compression ratio is limited, so that the image signal is not excessively compressed. Accordingly, a high quality image can be definitely reproduced.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-103873 (filed on Apr. 7, 1997) which is expressly incorporated herein by reference, in its entirety.

What is claimed is:

1. A compression ratio setting device of an electronic still video camera, comprising:

an imaging device, comprising a predetermined number of pixels, said imaging device providing a first image signal having a first plurality of data based upon the predetermined number of pixels;

an image signal generator that generates a second image signal having a second plurality of data based upon a selected number of pixels, said selected number of pixels being less than the predetermined number of pixels on which said first image signal is based;

a compression ratio setting processor that sets a compression ratio in accordance with the second plurality of data of said second image signal; and an image compression processor that compresses said second image signal according to the compression ratio set by said compression ratio setting processor to obtain a compressed image signal.

2. The compression ratio setting device of claim 1, wherein said image signal generator generates said second image signal by deriving data in the second plurality of data representing a single pixel from data in the first plurality of data representative of a plurality of pixels which are adjacent to each other in said imaging device.

3. The compression ratio setting device of claim 1, wherein said image signal generator generates said second image signal by deriving data in the second plurality of data representing a single pixel from data in the first plurality of data representative of a single pixel of said imaging device.

4. A compression ration setting device according to claim 1, wherein said image signal generator extracts a part of said first image signal, so that said second image signal is generated.

5. A compression ratio setting device according to claim 1, further comprising an image signal recording processor recording said compressed image signal in a recording medium, said image signal recording processor being able to record said compressed image signal in at least one of a quality priority mode, in which a quality of an image which is reproduced from said compressed image signal has priority over a number of images which can be recorded in said recording medium, and a number priority mode, in which said number of images has priority over said quality.

6. The compression ratio setting device of claim 5, wherein, when said quality priority mode is selected, said compression ratio, set by said compression ratio setting processor, decreases as the number of pixels represented by said second plurality of data increases.

7. The compression ratio setting device of claim 5, wherein, when said quality priority mode is selected, a maximum value of said compression ratio, set by said compression ratio setting processor, decreases as the number of pixels represented by said second plurality of data increases.

8. The compression ratio setting device of claim 5, wherein, when said number priority mode is selected, a maximum value of said compression ratio, set by said compression ratio setting processor, increases as the number of pixels represented by said second plurality of data increases.

9. A compression ratio setting device of an electronic still video camera, said device comprising:

an imaging device, comprising a predetermined number of pixels, said imaging device providing a first image signal having a first plurality of data based upon the predetermined number of pixels;

means for generating a second image signal having a second plurality of data based upon a selected number of pixels, said selected number of pixels being less than the predetermined number of pixels on which said first image signal is based;

means for setting a compression ratio in accordance with the second plurality of data of said second image signal; and means for compressing said second image signal according to the compression ratio set by said compression ratio setting means to obtain a compressed image signal.

10. A compression ratio setting device of an electronic still video camera, comprising:

an imaging device, comprising a predetermined number of pixels, said imaging device providing a first image signal having a first plurality of data based upon the predetermined number of pixels;

an image signal generator that enlarges a portion of said first image signal with a zoom magnification ratio to generate a second image signal having a second plurality of data based upon a selected number of pixels equal to said predetermined number of pixels upon which the first plurality of data is based;

a compression ratio setting processor that sets a compression ratio in accordance with said zoom magnification ratio; and an image signal compression processor that compresses said second image signal according to the compression ratio set by said compression ratio setting processor.

11. The compression ratio setting device of claim 10, wherein said image signal generator generates data in the second plurality of data representing a plurality of adjacent pixels in said second image signal, based upon data in the first plurality of data representative of a single pixel of said imaging device.

12. The compression ratio setting device of claim 10, wherein said image signal generator generates data in the second plurality of data representing a single pixel in said second image signal, based upon data in the first plurality of data representative of a single pixel of said imaging device.

13. A compression ratio setting device according to claim 10, further comprising an image signal recording processor recording said compressed image signal in a recording medium, said image signal recording processor being able to record said compressed image signal in at least one of a quality priority mode, in which a quality of an image which is reproduced from said compressed image signal has priority over a number of images which can be recorded in said recording medium, and a number priority mode, in which said number of images has priority over said quality.

14. A compression ratio setting device according to claim 13, wherein, when said quality priority mode is selected, said compression ratio, which is set by said compression ratio setting processor, increases as said zoom magnification ratio increases.

15. A compression ratio setting device according to claim 13, wherein a maximum value of said compression ratio, which can be set by said compression ratio setting processor, increases as said zoom magnification ratio increases.

16. A compression ratio setting device according to claim 13, wherein, when said number priority mode is selected, said compression ratio, which is set by said compression ratio setting processor, remains constant as said zoom magnification ratio increases.

17. A compression ratio setting device of an electronic still video camera, comprising:

an imaging device, comprising a predetermined number of pixels, said imaging device providing a first image signal having a first plurality of data based upon the predetermined number of pixels;

means for enlarging a portion of said first image signal with a zoom magnification ratio to generate a second image signal having a second plurality of data based upon a selected number of pixels equal to said predetermined number of pixels upon which the first plurality of data is based;

means for setting a compression ratio in accordance with said zoom magnification ratio; and means for compressing said second image signal according to the compression ratio set by said compression ratio setting means.

18. The compression ratio setting device of claim 1, further comprising an operation member for manually selecting the selected number of pixels upon which the second plurality of data is based.

19. The compression ratio setting device of claim 9, further comprising means for manually selecting the selected number of pixels upon which the second plurality of data is based.

20. The compression ratio setting device of claim 10, further comprising an operation member for manually selecting the selected number of pixels upon which the second plurality of data is based.

21. The compression ratio setting device of claim 17, further comprising means for manually selecting the selected number of pixels upon which the second plurality of data is based.

* * * * *